United States Patent [19]

Frank

[11] Patent Number: 5,217,762
[45] Date of Patent: Jun. 8, 1993

[54] SHEET-LIKE MOLDING AND PROCESS FOR ITS PREPARATION

[75] Inventor: Detlef Frank, Erlensee, Fed. Rep. of Germany

[73] Assignee: Hoechst Aktiengesellschaft, Frankfurt am Main, Fed. Rep. of Germany

[21] Appl. No.: 691,504

[22] Filed: Apr. 25, 1991

[30] Foreign Application Priority Data

Apr. 27, 1990 [DE] Fed. Rep. of Germany ....... 4013574

[51] Int. Cl.$^5$ .............................. C09K 19/00
[52] U.S. Cl. ....................... 428/1; 428/213; 428/220; 264/176.1; 264/211.12; 264/211.21; 425/197; 425/198; 425/199; 252/299.01; 252/299.64
[58] Field of Search .............. 428/1, 213, 220; 252/299.01, 299.64; 425/197, 198, 199; 264/211.12, 176.1, 211.21

[56] References Cited

U.S. PATENT DOCUMENTS

| | | | |
|---|---|---|---|
| 3,701,741 | 10/1972 | Meyer et al. | 521/48.5 |
| 4,161,470 | 7/1979 | Calundann | 524/599 |
| 4,219,461 | 8/1980 | Calundann | 528/173 |
| 4,325,903 | 4/1982 | Wissbrun et al. | 264/176.1 |
| 4,394,498 | 7/1983 | Kastelic | 428/1 |
| 4,888,127 | 12/1989 | Wada | 252/299.01 |
| 4,892,926 | 1/1990 | Suenaga | 252/299.01 |
| 4,902,369 | 2/1990 | Avramova | 428/1 |

FOREIGN PATENT DOCUMENTS 2041905 3/1972 Fed. Rep. of Germany .

*Primary Examiner*—Ellis P. Robinson
*Assistant Examiner*—Nasser Ahmad
*Attorney, Agent, or Firm*—Foley & Lardner

[57] ABSTRACT

A sheet-like molding made of a liquid-crystalline polymer which can be processed in the liquid-crystalline melt is described. It contains less than $1 \times 10^{-1}$, preferably less than $2 \times 10^{-2}$, flow irregularities per cm$^3$.

19 Claims, No Drawings

SHEET-LIKE MOLDING AND PROCESS FOR ITS PREPARATION

TECHNICAL FIELD

The present invention relates to a sheet-like molding made of liquid-crystalline polymers which can be processed in the melt and a process for its preparation by extrusion.

BACKGROUND OF THE INVENTION

Liquid-crystalline polymers which can be processed from the melt are already known and described in "Polymer Liquid Crystals", Ciferi, Krigbaum, Meyer, Academic Press, 1982, and "High Modulus Polymers", Zachariades, Porter, Marcel Dekker Inc., 1988. Polymers of the type mentioned are usually fully aromatic polyesters, such as polyester carbonates, polyester amides, polyester imides and similar polymers or block polymers having a block based on these systems. A known method of measurement by means of which the existence of a liquid-crystalline melt can be detected is polarization microscopy, which is also described in the relevant literature.

Liquid-crystalline melts have the property that the molecular orientation of the polymer main chain in them can be achieved in a particularly simple manner by various methods, for example mechanically or by applying electric or magnetic fields, which makes it possible to obtain moldings having strongly increased mechanical properties in one or more preferred orientations. This behavior of liquid-crystalline polymers is important for their further processing by the process of injection-molding but it also makes them in particular suitable for the preparation of fibers and films. If the melt of a liquid-crystalline polymer is extruded, for example from the sheet die of a conventional film extrusion unit, an orientation of the polymer in machine direction (MD), which can be further reinforced by a higher take-off rate for the melt from the die, can already be observed.

U.S. Pat. No. 4,161,470 describes the extrusion of liquid-crystalline polymers, such as, for example, of polycondensation products prepared from hydroxybenzoic acid and hydroxynaphthoic acid, to give fibers and films. A particular problem with the extrusion of liquid-crystalline polymers is that very often a kind of flow irregularity in the form of particles is observed, which could be designated as point-like morphological changes and which in any case cannot be removed by a conventional melt filtration. Upon orientation of the liquid-crystalline polymer, these flow irregularities are repeatedly the cause of thin places and in extreme cases even holes in the case of films or breakings in the case of fibers. These flow irregularities are thus responsible for the presence of weak or "predetermined" breaking points, which further intensifies one disadvantage of liquid-crystalline polymers, their tear propagation strength, which is usually low anyway. Apart from the mechanical properties, electrical properties and barrier properties are substantially affected by the flow irregularities.

SUMMARY OF THE INVENTION

Accordingly, it is an object of the present invention to significantly reduce or eliminate the number of flow irregularities in the extrusion of liquid-crystalline polymers, and thus increase the production safety and improve the product properties of moldings prepared from liquid-crystalline polymers and their constancy.

Another object of the present invention is to provide a liquid-crystalline polymer which can be processed in a liquid-crystalline melt and which preferably contains less than about $1 \times 10^{-1}$ flow irregularities per $cm^3$.

A further object of the present invention is to provide a liquid-crystalline polymer which permits a significant decrease in the die temperature without the formation of undesired deposits on the polymer in the die.

In accomplishing the foregoing objectives, there has been provided, in accordance with one aspect of the present invention, a sheet-like molding made of liquid-crystalline polymer of recurring building blocks which contains, as the main component, a liquid-crystalline polymer of recurring building blocks of the following type:

in which X symbolizes one or more functional groups of the following type: —COO—(ester), —OCOO—(carbonate), —CONH—(amide), =(CO)$_2$N—(imide) and in which Ar symbolizes one or more aromatic units of the following type: phenylene, naphthylene or units which can be formed by a combination of these two units according to the following scheme:

in which Y is one of the following groups: —O—, —S—, —CO—, —SO$_2$—or aliphatic hydrocarbons having up to six carbon atoms and in which Ar$_1$ and Ar$_2$ are identical or different aromatic units of the above-mentioned type, or are themselves combinations of these aromatic units.

In accordance with another aspect of the present invention there is provided a sheet-like molding made of liquid-crystalline polymer of recurring building blocks I and II, I, II and III, or, I, II, III, IV and V, in which I is

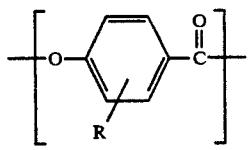

II is

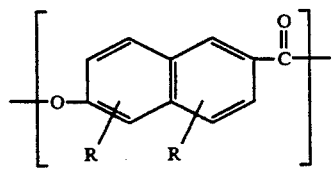

III is

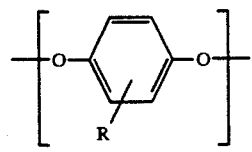

IV is

-continued

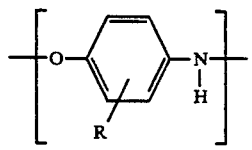

and V is

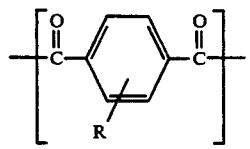

In accordance with still another aspect of the present invention there is provided a process for the preparation of a sheet-like molding made of a liquid-crystalline polymer processing in a liquid-crystalline melt and containing less than about $1 \times 10^{-1}$ flow irregularities per $cm^3$, which includes extruding the liquid-crystalline polymer to obtain a liquid-crystalline melt, subjecting the liquid-crystalline melt to high temperature melt filtration at temperatures substantially above the liquid-crystalline melting temperature in a melt filter, and passing said liquid-crystalline melt through a die.

Other objects, features and advantages of the present invention will become apparent to those skilled in the art from the following detailed description. It is to be understood, however, that the detailed description and specific examples, while indicating preferred embodiments of the present invention, are given by way of illustration and not limitation.

DETAILED DESCRIPTION OF THE PREFERRED EMBODIMENTS

In the context of the invention, flow irregularities are understood to mean the point-like morphological changes already mentioned before. The number $1 \times 10^{-1}$ flow irregularities per $cm^3$ corresponds to about 5 flow irregularities per $m^2$ for a film having a thickness of 50 μm.

In general, the objects of the present invention are achieved by a molding of the type mentioned at the beginning whose characteristic feature is that it contains less than about $1 \times 10^{-1}$ flow irregularities per $cm^3$, preferably less than about $2 \times 10^{-2}$ flow irregularities per $cm^3$.

The molding can be a film having a thickness in the range of about 5 to 1000 micrometer, preferably 10 to 500 micrometer, more preferably 20 to 200 micrometer.

The liquid-crystalline polymers comprise in particular recurring building blocks of the following type:

in which X symbolizes one or more functional groups of the following type: —COO—(ester), —OCOO—(carbonate), —CONH—(amide), =(CO)₂N—(imide) and in which Ar symbolizes one or more aromatic units of the following type: phenylene, naphthylene or units which can be formed by a combination of these two units according to the following scheme:

in which Y is one of the following groups: —O—, —S—, —CO—, —SO₂ or aliphatic hydrocarbons having up to six carbon atoms and in which $Ar_1$ and $Ar_2$ are identical or different aromatic units of the above-mentioned type, or are themselves combinations of these aromatic units.

Moreover, the aromatic units can additionally be mono- or polysubstituted, suitable substituents being alkyl or aryl groups having 1 to 20 carbon atoms or halogens. Further, the alkyl or aryl groups can themselves be partially or else completely halogenated or alternatively be bound to the aromatic units of the polymer main chain via a functional group, such as —O—, —S—, —CO— or —SO₂—. The above list is by way of example and not intended to limit the invention.

Liquid-crystalline polymers which are particularly preferred in the context of the invention are fully aromatic polyesters essentially composed of two units I and II, a 4-oxybenzoic acid radical and a 6-oxy-2-naphthoic acid radical, which are described in detail in DE-A 2,844,817.

One preferred liquid-crystalline polymer includes recurring building blocks I and II, wherein I is

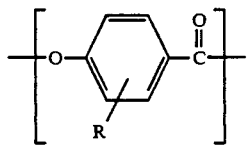

and II is

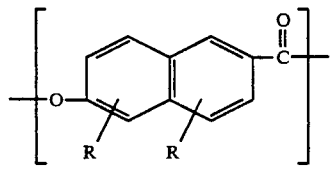

and wherein the polyester contains between about 10 to 90 mol% of component I and between about 10 to 90 mol% of component II and is capable of forming a liquid-crystalline melt below about 350° C., preferably below about 300° C., and the group R is hydrogen.

Another preferred liquid crystalline polymer includes recurring building blocks I, II and III wherein I and II are as defined above and III is

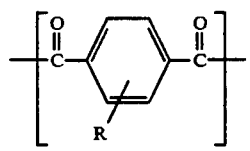

and wherein the polyester mentioned contains 30–70 mol% of component I and is capable of forming a liquid-crystalline melt below 350° C., preferably below 325° C., particularly preferably below 300° C., and the group R is hydrogen.

Still another preferred liquid-crystalline polymer includes recurring building blocks I, II, III, IV and V, wherein I, II and III are as defined above, and IV is

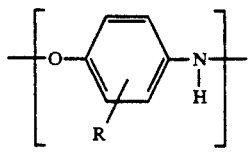

and V is

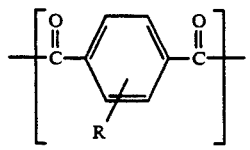

and V is and wherein the polyester mentioned contains between about 30 to 70 mol% of component I and is capable of forming a liquid-crystalline melt below about 350° C., preferably below about 325° C, particularly preferably below about 300° C., and the group R is hydrogen; or, wherein the polyester mentioned contains between about 30 to 70 mol% of component II and is capable of forming a liquid-crystalline melt below about 350° C., preferably below 325° C., particularly preferably below about 300° C., and the group R is hydrogen.

The aromatic units of blocks I, II, III, IV or V can additionally be mono- or polysubstituted, in which the substituents are alkyl or aryl groups having 1 to 20 carbon atoms or halogens and in which the alkyl or aryl groups are alternatively themselves partially or else completely halogenated or alternatively bound to the aromatic units of the polymer main chain via a functional group, such as —O—, —S—, —CO— or —SO$_2$—.

In general, the foregoing building block components are capable of forming a liquid-crystalline melt below 350° C., preferably below about 325° C., and most preferably below about 300° C.

Moldings of the type according to the invention containing less than about 1 ×10$^{-1}$ flow irregularities per cm$^3$ and comprising the above liquid-crystalline polymers are prepared by melt extrusion by means of an extruder and subsequent die, and subjecting the melt of the liquid-crystalline polymer to high-temperature melt filtration at temperatures substantially above the liquid-crystalline melting temperature. Temperatures in the range from about 30 to 150° C., preferably about 40 to 100° C., above the liquid-crystalline melting temperature are regarded as substantially higher temperature. The liquid-crystalline melting temperature is different for the various polymers. For the preferred liquid-crystalline polymers, it is in the range of from about 250 to 370° C.

According to a preferred embodiment of the invention, the high-temperature melting filtration is carried out in a melt filter at a temperature in the range from about 300 to 410° C., preferably from about 330 to 400° C. Preferably the melt filter is inserted in the line between the extruder and the die.

Surprisingly, it has been found that after the process described no flow irregularities in the form of point-like morphological changes or other point-like irregularities of the polymer can be observed longer. Surprisingly, the high melting temperatures resulting therefrom moreover allow a significant decrease in the die temperature without the formation of undesired deposits (frozen materials) of the liquid-crystalline polymer in the die.

The invention is further described by the following example which, as will be understood, is given by way of illustration and not limitation.

EXAMPLE 1

A film was prepared from the liquid crystal polyester Vectra®A 900 from Hoechst Celanese Corp., a fully aromatic polycondensation product prepared from p-hydroxybenzoic acid and 6-hydroxy-2-naphthoic acid by melt extrusion on a conventional flat-film extrusion unit. For this purpose, an extruder having a screw of 30 mm in diameter and a flat film die of 330 mm in width and a die gap having an orifice of 0.5 mm was used. A melt filter having an average pore diameter of 15 μm was inserted in the line between the extruder and the die. Before extrusion, the liquid-crystalline polymer was dried at 140° C. for a period of about one hour. The possible die temperatures were determined by visual evaluation of the film. The lower die temperature is the temperature at which frozen material (deposits) of the polymer in the die gap could not yet be observed, while the upper die temperature indicates the value at which the film was still obtained with a homogeneous film surface, ie. without superstructures. The results of three tests, some without a melt filter and some with a melt filter inserted as above but at different filter temperatures, are listed in Table I below.

TABLE I

| Sample No. | Melt Filter | Filter Temperature °C. | Lower Die Temperature °C. | Upper Die Temperature °C. | Film Thickness μm | Flow Irregularities Number/m$^2$ |
| --- | --- | --- | --- | --- | --- | --- |
| 1 | without | — | 280 | 300 | 50 | 50 |
| 2 | with | 300 | 280 | 300 | 50 | 55 |
| 3 | with | 350 | 240 | 300 | 50 | <1 |

It will be appreciated that the foregoing description is of preferred exemplary embodiments of the invention and that the invention is not limited to the specific forms shown. Many modifications may be made in the design and arrangement of the components without departing from the spirit of the invention as expressed in the appended claims.

What is claimed is:

1. A sheet molding made of a liquid-crystalline polymer which can be processed in the liquid-crystalline melt, which contains less than abut 1 ×10$^{-1}$ flow irregularities per cm$^3$, subjecting an extruded liquid crystalline melt to filtering at temperatures in the range from about 30 to 150° C. above said liquid crystalline melting temperature.

2. A molding as claimed in claim 1, which contains less than about 2 ×10$^{-3}$ flow irregularities per cm$^3$.

3. A molding as claimed in claim 1, which contains, as the main component, a liquid-crystalline polymer of recurring building blocks of the following type:

—X—Ar—, in which X symbolizes one or more functional groups of the following type: —COO—(ester), —OCOO—(carbonate), —CONH—(amide), =(CO)₂N—(imide) and in which Ar symbolizes one or more aromatic units of the following type: phenylene, naphthylene or units which can be formed by a combination of these two units according to the following scheme:

Ar₁—Ar₂ or Ar₁—Y—Ar₂, in which Y is one of the following groups: —O—, —S—, —CO—, —SO₂— or aliphatic hydrocarbons having up to six carbon atoms and in which Ar₁ and Ar₂ are identical or different aromatic units of the above-mentioned type, or are themselves combinations of these aromatic units.

4. A molding as claimed in claim 1, wherein the main component is a liquid crystal polymer of recurring building blocks I and II, in which I is

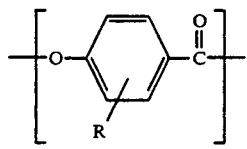

and II is

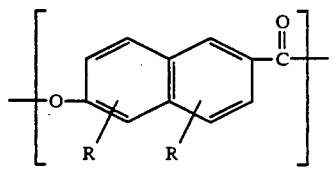

and wherein the polyester contains between about 10 to 90 mol% of component I and between about 10 to 90 mol% of component II and is capable of forming a liquid-crystalline melt below about 350° C.

5. A molding as claimed in claim 1, wherein the main component is a liquid crystal polymer of recurring building blocks I, II and III, in which I is

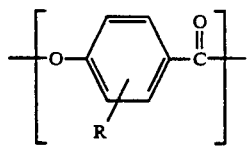

II is

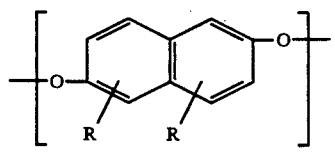

and III is

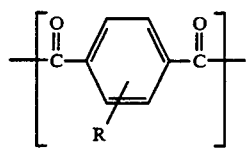

and wherein the polyester mentioned contains between about 30 to 70 mol% or component I and is capable of forming a liquid-crystalline melt below about 350° C.

6. A molding as claimed in claim 1, wherein the main component is a liquid crystal polymer of recurring building blocks I, II, III, IV and V, in which I is

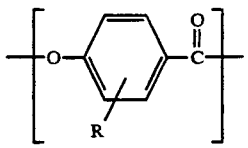

II is

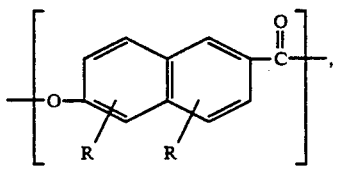

III is

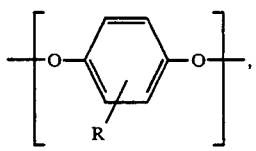

IV is

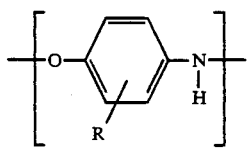

and V is

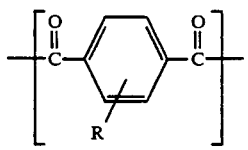

and wherein the polyester mentioned contains between about 30 to 70 mol% of component I and is capable of forming a liquid-crystalline melt below about 350° C.

7. A molding a claimed in claim 1, wherein the main component is a liquid crystal polymer of recurring building blocks I, II, III, IV and V, in which I is

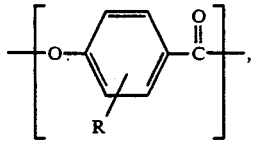

II is

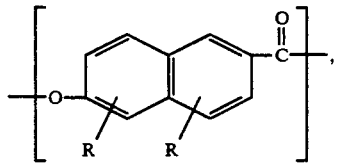

III is

-continued

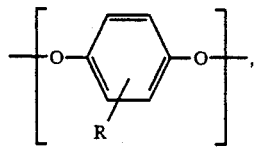

IV is

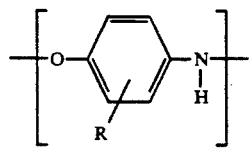

and V is

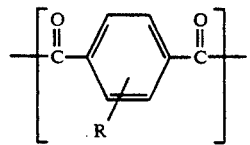

and wherein the polyester mentioned contains between about 30 to 70 mol% of component II and is capable of forming a liquid-crystalline melt below about 350° C.

8. A molding as claimed in claim 3, wherein said aromatic units are mono- or polysubstituted, in which the substitutents are alkyl or aryl groups having 1 to 20 carbon atoms or halogens.

9. A molding as claimed in claim 8, wherein said alkyl and aryl groups are partially halogenated.

10. A molding as claimed in claim 8, wherein said alkyl and aryl groups are completely halogenated.

11. A molding as claimed in claim 8, wherein said alkyl and aryl groups are bound to the aromatic units of the polymer main chain via a functional group selected from —O—, —S—, —CO— or —SO$_2$—.

12. A molding as claimed in claim 3, which has the form of a film having a thickness in the range of about 5 to 1000 μm.

13. A molding as claimed in claim 12, wherein said thickness is in the range of about 10 to 500 μm.

14. A molding as claimed in claim 13, wherein said thickness is in the range of about 20 to 200 μm.

15. A molding as claimed in claim 3, prepared by a process comprising the steps of:
   extruding the liquid-crystalline polymer in an extruder to obtain a liquid-crystalline melt;
   high temperature melt filtrating said liquid-crystalline melt at temperatures in the range from about 30 to 150° C. above the liquid-crystalline melting temperature in a melt filter; and,
   passing said liquid-crystalline melt through a die.

16. The molding as claimed in claim 15, wherein said step of high-temperature melt filtrating is carried out at a temperature in the range of from about 40 to 100° C. above the liquid-crystalline melting temperature.

17. The molding as claimed in claim 15, wherein said step of high-temperature melt filtrating is carried out at a temperature in the range of from about 300 to 410° C.

18. The molding as claimed in claim 17, wherein said step of high temperature filtrating is carried out at a temperature in the range of from about 330 to 400° C.

19. The molding as claimed in claim 15, wherein said step of high temperature melt filtrating comprises passing said liquid-crystalline melt through a melt filter inserted in the line intermediate of said extruder and said die.

* * * * *

UNITED STATES PATENT AND TRADEMARK OFFICE
CERTIFICATE OF CORRECTION

PATENT NO. : 5,217,762
DATED : June 8, 1993
INVENTOR(S) : Detlef FRANK

It is certified that error appears in the above-indentified patent and that said Letters Patent is hereby corrected as shown below:

Column 6, line 64, Claim 2, delete "$2 \times 10^{-3}$" and insert --$2 \times 10^{-2}$--.

Signed and Sealed this

Twenty-sixth Day of April, 1994

*Attest:*

BRUCE LEHMAN

*Attesting Officer*  Commissioner of Patents and Trademarks